United States Patent [19]

Hall et al.

[11] 4,410,043

[45] Oct. 18, 1983

[54] METHOD FOR INHIBITION OF CARBONATE DISSOLUTION IN THE RECOVERY OF OIL UTILIZING $CO_2$

[75] Inventors: Arthur C. Hall, Dallas; Franklin R. Lunsford, Lewisville, both of Tex.

[73] Assignee: Mobil Oil Corporation, New York, N.Y.

[21] Appl. No.: 382,448

[22] Filed: May 26, 1982

[51] Int. Cl.³ .............................................. E21B 43/22
[52] U.S. Cl. ...................................... 166/273; 166/274
[58] Field of Search ............... 166/273, 274, 275, 268, 166/305 R

[56] References Cited

U.S. PATENT DOCUMENTS

| | | | |
|---|---|---|---|
| 2,875,833 | 3/1959 | Martin | 166/268 |
| 3,025,911 | 3/1962 | Bergman | 166/275 X |
| 3,414,053 | 12/1968 | Treiber et al. | 166/273 |
| 3,921,714 | 11/1975 | Foster | 166/274 X |
| 4,074,755 | 2/1978 | Hill et al. | 166/273 X |
| 4,359,093 | 11/1982 | Bernard | 166/273 |

OTHER PUBLICATIONS

Ostroff, "Compatibility of Waters for Secondary Recovery", *Producers Monthly,* Mar. 1963, pp. 2–9.
Stalkup, "Carbon Dioxide Miscible Flooding: Past, Present, and Outlook for the Future", *Journal of Petroleum Technology,* Aug. 1978, pp. 1102–1112.

*Primary Examiner*—Stephen J. Novosad
*Assistant Examiner*—George A. Suchfield
*Attorney, Agent, or Firm*—Alexander J. McKillop; James F. Powers, Jr.; Lawrence O. Miller

[57] ABSTRACT

Recovery of oil in a subterranean oil-bearing formation comprising injecting a slug of an aqueous solution containing a water-soluble salt comprising sodium oxalate or sodium fluoride, injecting a slug of $CO_2$ and injecting a driving fluid to displace the oil toward a production well for recovery. The water-soluble salt forms an insoluble precipitate with calcium ions in the formation and preserves more of the injected $CO_2$ for oil displacement including preventing undesirable changes in formation permeability.

18 Claims, 5 Drawing Figures

FIG. IA
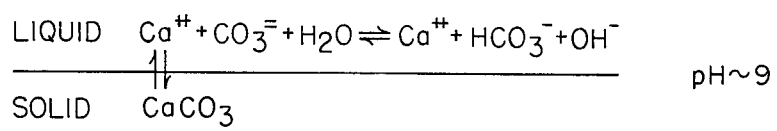
FIG. IB
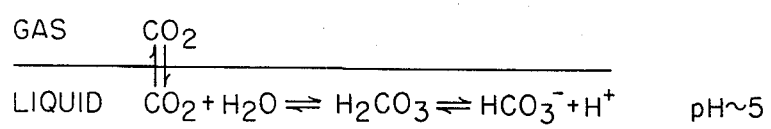
FIG. IC
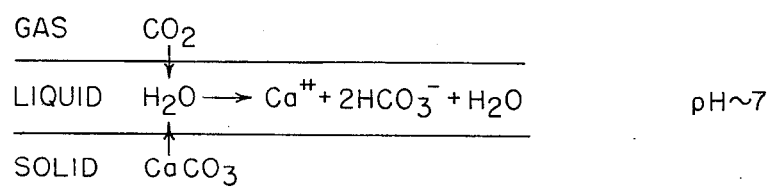
FIG. ID
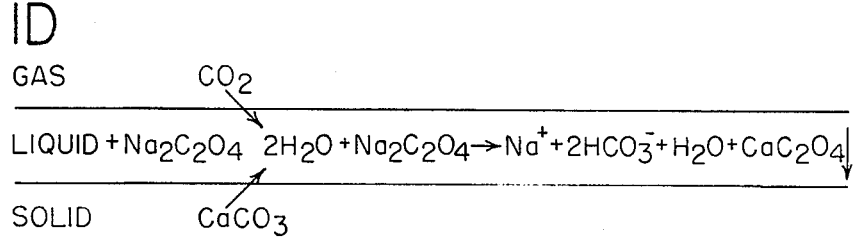
FIG. IE
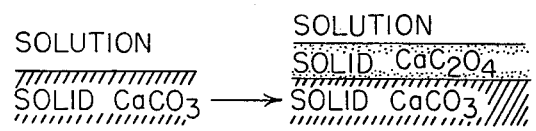

METHOD FOR INHIBITION OF CARBONATE DISSOLUTION IN THE RECOVERY OF OIL UTILIZING CO₂

FIELD AND BACKGROUND OF THE INVENTION

1. Field of the Invention

The invention relates to a method for producing oil by injecting into an oil-bearing formation a slug of $CO_2$ followed by a fluid drive. An improvement is to inject prior to the $CO_2$ slug, a slug containing a water soluble salt capable of reacting with calcium ions from the formation to produce an insoluble salt which precipitates on mineral surfaces, thereby inhibiting mineral dissolution and preserving more of the $CO_2$ for oil displacement.

2. Background of the Invention

In the recovery of oil from oil-bearing formations, it usually is possible to recover only minor portions of the original oil in place by the so-called primary recovery methods which utilize only the natural forces present in the formation. Thus, a variety of supplemental recovery techniques such as thermal recovery methods, waterflooding and miscible flooding have been employed in order to increase the recovery of oil from subterranean formations.

One technique of enhanced recovery is to inject into the formation a slug of $CO_2$ to mobilize oil, and subsequently inject a driving fluid to displace the oil-rich and $CO_2$ phases toward a production well. One of the major drawbacks or disadvantages in the use of $CO_2$ in such a miscible flood process is the incidental consumption or loss of $CO_2$ in the formation. When the connate brine of an oil-bearing formation is contacted by $CO_2$ in the course of $CO_2$ flooding operations, carbonic acid is formed which, by ionization reduces the prevailing pH, i.e., $$H_2O + CO_2 \rightleftharpoons H_2CO_3 \rightleftharpoons H^+ + HCO_3^-$$

This in turn reduces the existing carbonate ion concentration, which causes carbonate minerals, e.g., calcite, previously in equilibrium with the aqueous phase, to dissolve until a new equilibrium is established, i.e., $$H^+ + CO_3^= \rightleftharpoons HCO_3^-$$

$$CaCO_3 \rightarrow Ca^{++} + CO_3^=$$

In addition to causing non-essential and uneconomical consumption of $CO_2$, such dissolution may produce undesirable changes in formation permeability by creating channels, especially during the early stages of the $CO_2$ flood, or by plugging existing permeability during the late stages. See G. D. Ross et al, "The Dissolution Effects of CO₂-Brine Systems on the Permeability of U.K. and North Sea Calcareous Sandstones", Society of Petroleum Engineers, U.S. Dept. of Energy 10685, Tulsa, April, 1982.

The present invention provides a method for more effectively utilizing $CO_2$ in combination with a driving fluid in an oil recovery process and thereby enhancing oil recovery. The invention comprises injecting aqueous solutions containing a water-soluble salt comprising sodium oxalate or sodium fluoride preceding or simultaneously with the $CO_2$ so as to protect the formation mineral matrix from attack by carbonic acid generated in-situ, thereby preserving more of the $CO_2$ for oil displacement and preventing undesirable changes in formation permeability.

SUMMARY OF THE INVENTION

This invention provides a method of recovering oil from a subterranean, oil-containing formation penetrated by an injection well and a production well, and containing minerals and calcium ions dissolved in interstitial water, comprising injecting through the injection well and into the subterranean formation a slug of an aqueous solution containing a water-soluble salt whose anion is capable of precipitating calcium ions dissolved in the interstitial water to form an insoluble barrier on the mineral surfaces that inhibit mineral dissolution caused by $CO_2$, injecting a slug of $CO_2$ through the injection well and into the subterranean formation so as to mobilize the oil, thereafter injecting a drive fluid such as water into the formation through the injection well and recovering oil from the formation through the production well. The water-soluble salt is selected from the group consisting of sodium oxalate and sodium fluoride. Sodium oxalate reacts with the calcium ions to form an insoluble barrier comprising calcium oxalate. Sodium fluoride reacts with the calcium ions to form an insoluble barrier comprising calcium fluoride. The amount of water-soluble salt injected is within the range of 0.1 to 0.5 pore volume and the amount of $CO_2$ injected is within the range of 0.02 to 0.05 pore volume. Sequential injection of a slug of water-soluble salt and a slug of $CO_2$ may be repeated for a plurality of cycles.

BRIEF DESCRIPTION OF THE DRAWING

FIG. 1A illustrates the hydrolytic equilibrium of solid calcium carbonate in contact with water in the formation.

FIG. 1B illustrates hydrolytic equilibrium of carbon dioxide with water in the formation.

FIG. 1C illustrates the dissolution of solid calcium carbonate in water in the formation upon exposure to injected carbon dioxide.

FIG. 1D illustrates the addition of a water-soluble salt comprising $Na_2C_2O_4$ to precipitate $CaC_2O_4$ which inhibits dissolution by isolating the calcium carbonate in the formation from contact by $CO_2$.

FIG. 1E further illustrates formation of the insoluble precipitate layer comprising $CaC_2O_4$ on the calcium carbonate in the formation thereby inhibiting its dissolution by $CO_2$.

DESCRIPTION OF THE PREFERRED EMBODIMENTS

The method of the invention involves an improved fluid drive process for recovering oil from a subterranean, oil-containing formation using $CO_2$ as a displacing aid wherein a water-soluble salt whose anion forms an insoluble precipitate with calcium ions in the interstitial water of the formation is injected into the formation prior to the injection of $CO_2$ that inhibits dissolution of calcium carbonate by $CO_2$. Inhibiting calcium carbonate dissolution by $CO_2$ reduces incidental consumption or loss of $CO_2$, thereby preserving more $CO_2$ for oil displacement, and also prevents undesirable changes in permeability of the formation.

In carrying out the invention, a subterranean, oil-containing formation is penetrated by at least one injection well and at least one spaced-apart production well in fluid communication with a substantial portion of the formation. The injection and production wells are completed in a conventional manner, such as perforating the wells throughout the full or a substantial amount of the vertical thickness of the oil-containing formation. The oil-containing formation contains minerals, principally calcium carbonate, and calcium ions dissolved minerals, principally calcium carbonate, and calcium ions dissolved in interstitial water.

In the first step, a slug of an aqueous solution containing a water-soluble salt from the group consisting of sodium oxalate and sodium fluoride is injected into the formation via the injection well with the preferred salt being sodium oxalate. The aqueous solution should contain less than 10 percent by weight of the water-soluble salt. The slug of sodium oxalate or sodium fluoride is within the range of 0.1 to 0.5 pore volume. The size of the slug injected will depend on a number of conditions, including the thickness of the formation and its characteristics. The injected water-soluble salt reacts with calcium ions in the interstitial water of the formation to produce an insoluble salt which precipitates on mineral surfaces, as described in detail hereinafter.

After a predetermined amount of the aqueous solution containing a water-soluble salt has been injected into the formation via the injection well, a slug of carbon dioxide within the range of 0.02 to 0.05 pore volume is injected into formation via the injection well followed by a driving fluid comprising water that displaces the oil through the formation into at least one spaced-apart production well, and thereafter producing the displaced oil from the production well. The injected $CO_2$ interacts with the oil so as to facilitate its displacement from the formation by the water drive. The water drive is continued until the fluid being recovered from the production well comprises an unfavorable ratio of oil to water.

In another embodiment of the present invention, the sequence of injecting a slug of an aqueous solution containing sodium oxalate or sodium fluoride followed by a slug of $CO_2$ may be repeated for a plurality of cycles prior to injecting a drive fluid. In addition, all three cycles may be repeated comprising injecting a slug of the water-soluble salt, a slug of $CO_2$ and drive fluid.

In still another embodiment of the present invention, the aqueous solution containing sodium oxalate or sodium fluoride may be injected simultaneously with the $CO_2$.

To appreciate the enhanced oil recovery of the present invention, it is necessary to understand the mechanism of mineral dissolution of oil-bearing rocks encountered during a carbon dioxide flooding operation in accordance with prior procedures. During injection of $CO_2$ into a formation via an injection well during a $CO_2$ flooding operation, the $CO_2$ invades the formation dissolving in formation water to an extent that increases with increasing $CO_2$ pressure, producing carbonic acid ($H_2CO_3$) in accordance with the following equation:

$$CO_2 + H_2O \rightleftharpoons H_2CO_3 \qquad (1)$$

Carbonic acid in turn dissociates in accordance with the following equation so that the solution becomes acidic due to the presence of hydrogen ion (H+), and the acidity increases with increased pressure of $CO_2$.

$$H_2CO_3 \rightleftharpoons H^+ + HCO_3^- \qquad (2)$$

Oil bearing rocks in the formation typically contain calcite and/or dolomite ($CaCO_3$), either as intergranular cement as in sandstones, or else as the main mineral constituent, as in limestones. These minerals have limited water solubility and react with water in accordance with the following equation:

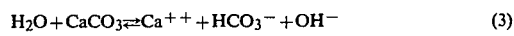
$$H_2O + CaCO_3 \rightleftharpoons Ca^{++} + HCO_3^- + OH^- \qquad (3)$$

At ordinary temperature and atmospheric pressure, the solubility of calcium carbonate in water is about 0.05 gm/liter.

However, in the presence of acidity the solubility increases greatly, and with the carbonic acid in accordance with the following equation:

$$H_2CO_3 + CaCO_3 \rightleftharpoons Ca^{++} + 2HCO_3^- \qquad (4)$$

For example, at ordinary temperatures and 10 bar or more $CO_2$ pressure, the solubility increases to about 2 grams/liter; i.e., by a factor $\simeq \times 40$.

In $CO_2$ flooding for residual oil such a degree of mineral dissolution will result not only in substantial non-essential consumption or loss of $CO_2$, but also undesirable changes in formation permeability. Changes in formation permeability can cause undesirable fingering or channeling in the formation near injectors. Precipitation near producers can lead to plugging.

The dissolution of formation $CaCO_3$ in accordance with equations (1) through (4) is illustrated in FIGS. 1A–1C.

Upon injecting an aqueous solution containing sodium oxalate, the anion reacts with the calcium ion, $Ca^{++}$, in the oil-bearing formation rocks to form an insoluble precipitate in accordance with the following equations:

$$Na_2C_2O_4 \rightleftharpoons 2Na^+ + C_2O_4^= \qquad (5)$$

$$C_2O_4^= + Ca^{++} \rightarrow CaC_2O_4 \qquad (6)$$

The calcium oxalate precipitate forms an impervious layer, and therefore prevents further dissolution of the underlying $CaCO_3$ by protecting the $CaCO_3$ from contact with the carbonic acid formed in-situ as illustrated in FIGS. 1D and 1E.

If the water-soluble salt injected is sodium fluoride, then the impervious layer formed is calcium fluoride.

By the term "pore volume" as used herein, is meant that volume of the portion of the formation underlying the well pattern employed as described in greater detail in U.S. Pat. No. 3,927,716 to Burdyn et al, the disclosure of which is hereby incorporated by reference. The method according to the invention may be practiced using a variety of well patterns. Any number of wells, which may be arranged according to any pattern, may be applied in using the present method as illustrated in U.S. Pat. No. 3,927,716 to Burdyn et al.

The foregoing description of our invention has been directed to particular details in accordance with the requirements of the Patent Act and for purposes of explanation and illustration. It will be apparent, however, to those skilled in this art that many modifications and changes may be made without departing from the scope and spirit of the invention. It is further apparent that persons of ordinary skill in this art will, on the basis of this disclosure, be able to practice the invention within a broad range of process conditions. It is our intention in the following claims to cover all such equivalent modifications and variations as fall within the true scope and spirit of our invention.

What is claimed is:

1. A method for recovering oil from a subterranean, oil-containing formation penetrated by an injection well and a production well, said formation containing minerals, principally calcium carbonate, and calcium ions dissolved in interstitial water, comprising:
   (a) injecting into said formation via said injection well a slug of an aqueous solution containing a water-soluble salt whose anion is capable of precipitating calcium ions in the interstitial water to form an insoluble barrier on the mineral surfaces that inhibits mineral dissolution caused by $CO_2$,
   (b) injecting a slug of $CO_2$ into said formation via said injection well so as to mobilize the oil;
   (c) injecting a drive fluid into the formation via said injection well to displace oil toward said production well; and
   (d) recovering oil from the formation via said production well.

2. The method of claim 1 wherein the water-soluble salt is selected from the group consisting of sodium oxalate and sodium fluoride.

3. The method of claim 1 wherein the water-soluble salt is sodium oxalate and the insoluble barrier formed is calcium oxalate.

4. The method of claim 1 wherein the water-soluble salt is sodium fluoride and the insoluble barrier formed is calcium fluoride.

5. The method of claim 1 wherein the amount of aqueous solution of a water-soluble salt injected into the formation is within the range of 0.1 to 0.5 pore volume.

6. The method of claim 1 wherein the aqueous solution of a water soluble salt contains less than 10 percent by weight of the water-soluble salt.

7. The method of claim 1 wherein steps (a) and step (b) are repeated for a plurality of cycles.

8. The method of claim 1 wherein the amount of $CO_2$ injected into the formation is 0.02 to 0.05 pore volume.

9. The method of claim 1 wherein steps (a), (b) and (c) are repeated for a plurality of cycles.

10. The method of claim 1 wherein the drive fluid comprises water.

11. A method for recovering oil from a subterranean, oil-containing formation penetrated by an injection well and a production well, said formation containing minerals, principally calcium carbonate, and calcium ions dissolved in interstitial water, comprising:
    (a) injecting into said formation via said injection well a slug of $CO_2$ so as to mobilize the oil;
    (b) simultaneously injecting into said formation via said injection well an aqueous solution containing a water-soluble salt whose anion is capable of precipitating calcium ions in the interstitial water to form an insoluble barrier on the mineral surfaces that inhibits mineral dissolution caused by $CO_2$;
    (c) injecting a drive fluid into the formation via said injection well to displace oil toward said production well; and
    (d) recovering oil from the formation via said production well.

12. The method of claim 11 wherein the water-soluble salt is selected from the group consisting of sodium oxalate and sodium fluoride.

13. The method of claim 11 wherein the water-soluble salt is sodium oxalate and the insoluble barrier formed is calcium oxalate.

14. The method of claim 11 wherein the water-soluble salt is sodium fluoride and the insoluble barrier formed is calcium fluoride.

15. The method of claim 11 wherein said aqueous solution contains less than 10 percent by weight of the water-soluble salt.

16. The method of claim 11 wherein the the amount of aqueous solution of a water-soluble salt injected into the formation is within the range of 0.1 to 0.5 pore volume.

17. The method of claim 11 wherein the amount of $CO_2$ injected into the formation is 0.02 to 0.05 pore volume.

18. The method of claim 11 wherein steps (a), (b) and (c) are repeated for a plurality of cycles.

* * * * *